US010942512B2

(12) United States Patent
Kimura et al.

(10) Patent No.: US 10,942,512 B2
(45) Date of Patent: Mar. 9, 2021

(54) VEHICLE OPERATING DEVICE, AND VEHICLE

(71) Applicant: Mitsubishi Heavy Industries Engineering, Ltd., Yokohama (JP)

(72) Inventors: Keisuke Kimura, Tokyo (JP); Kenta Masumori, Tokyo (JP); Fujio Shinoki, Tokyo (JP); Satoshi Kawamoto, Tokyo (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 376 days.

(21) Appl. No.: 15/511,114

(22) PCT Filed: Sep. 8, 2015

(86) PCT No.: PCT/JP2015/075451
§ 371 (c)(1),
(2) Date: Mar. 14, 2017

(87) PCT Pub. No.: WO2016/047433
PCT Pub. Date: Mar. 31, 2016

(65) Prior Publication Data
US 2017/0277178 A1 Sep. 28, 2017

(30) Foreign Application Priority Data
Sep. 22, 2014 (JP) .............................. JP2014-192769

(51) Int. Cl.
*G05D 1/00* (2006.01)
*G05B 9/02* (2006.01)
(Continued)

(52) U.S. Cl.
CPC ............ *G05D 1/0022* (2013.01); *B61L 3/127* (2013.01); *B61L 15/0027* (2013.01);
(Continued)

(58) Field of Classification Search
CPC .. G05D 1/0022; G05D 1/0016; G06F 3/0488; G06F 1/1632; B61L 27/0094;
(Continued)

(56) References Cited

U.S. PATENT DOCUMENTS 4,582,280 A * 4/1986 Nichols .................... B60L 15/32
105/61
9,753,493 B2 * 9/2017 Prejer .................. B60R 11/0252
(Continued)

FOREIGN PATENT DOCUMENTS

EP 2672354 A1 12/2013
JP S60-193759 A 10/1985
(Continued)

OTHER PUBLICATIONS

PCT/ISA/210, "International Search Report for International Application No. PCT/JP2015/075451," dated Oct. 13, 2015.
(Continued)

*Primary Examiner* — Christian Chace
*Assistant Examiner* — Michael F Whalen
(74) *Attorney, Agent, or Firm* — Manabu Kanesaka; Kenneth Berner; Benjamin Hauptman

(57) ABSTRACT

A vehicle operating device includes a portable display unit configured to display a state of a vehicle, a portable input unit configured to receive operation information of the vehicle input thereto on the basis of a displayed content by the display unit, a first information processing unit configured to process first information among input operation information, a second information processing unit configured to process second information, which is different from the first information, among the input operation information, an interlock system configured to enable only the first information to be processed in an operating state and enable the first information and the second information to be
(Continued)

processed in a released state, and a portable wireless output unit configured to output an operation signal of the vehicle based only on the first information processed in the operating state.

6 Claims, 8 Drawing Sheets

(51) Int. Cl.
  *B61L 27/00* (2006.01)
  *B61L 3/12* (2006.01)
  *B61L 15/00* (2006.01)
  *G06F 1/16* (2006.01)
  *B61L 27/04* (2006.01)
  *G06F 3/0488* (2013.01)

(52) U.S. Cl.
  CPC ....... *B61L 15/0081* (2013.01); *B61L 27/0077* (2013.01); *B61L 27/0094* (2013.01); *B61L 27/04* (2013.01); *G05B 9/02* (2013.01); *G05D 1/0016* (2013.01); *G06F 1/1632* (2013.01); *G06F 3/0488* (2013.01)

(58) Field of Classification Search
  CPC .. B61L 27/0077; B61L 27/04; B61L 15/0081; B61L 15/0027; B61L 3/127; G05B 9/02
  See application file for complete search history.

(56) References Cited

U.S. PATENT DOCUMENTS

| | | | | |
|---|---|---|---|---|
| 2004/0238695 A1* | 12/2004 | Horst | ...................... | B61L 3/127 246/187 A |
| 2008/0077285 A1* | 3/2008 | Kumar | .................... | B61L 3/006 701/19 |
| 2010/0037072 A1* | 2/2010 | Nejah | ................... | G06F 1/1632 713/310 |
| 2010/0259359 A1* | 10/2010 | Ishikawa | ............... | B60R 16/033 340/5.2 |
| 2013/0204493 A1* | 8/2013 | Ricci | ...................... | G06F 17/00 701/41 |
| 2013/0204943 A1* | 8/2013 | Ricci | .................... | G06F 3/0484 709/204 |
| 2013/0218412 A1* | 8/2013 | Ricci | ...................... | G06F 17/00 701/36 |
| 2013/0227648 A1* | 8/2013 | Ricci | .................... | G06F 3/0484 726/3 |
| 2014/0180499 A1* | 6/2014 | Cooper | ............... | B61L 15/0081 701/2 |
| 2014/0223065 A1* | 8/2014 | Jolda | ........................ | G06F 13/36 710/303 |
| 2016/0005250 A1 | 1/2016 | Inoue | | |
| 2016/0161989 A1* | 6/2016 | Prejer | ................. | B60R 11/0252 361/679.41 |
| 2016/0266610 A1* | 9/2016 | Nessel | ................ | B60R 11/0252 |
| 2016/0295090 A1* | 10/2016 | Ito | .......................... | G03B 17/02 |

FOREIGN PATENT DOCUMENTS

| | | |
|---|---|---|
| JP | H10-276460 A | 10/1998 |
| KR | 10-2009-0091396 A | 8/2009 |
| KR | 10-2013-0011885 A | 1/2013 |
| WO | 2014/136428 A1 | 9/2014 |

OTHER PUBLICATIONS

PCT/ISA/237 "Written Opinion of the International Searching Authority for International Application No. PCT/JP2015/075451," dated Oct. 13, 2015.

* cited by examiner

VEHICLE OPERATING DEVICE, AND VEHICLE

RELATED APPLICATIONS

The present application is National Phase of International Application No. PCT/JP2015/075451 filed Sep. 8, 2015 and claims priority of Japanese Patent Application No. 2014-192769 filed Sep. 22, 2014, the disclosure of which is hereby incorporated by reference herein in its entirety.

TECHNICAL FIELD

The present invention relates to a vehicle operating device for operating various types of functions of a vehicle and a vehicle having the same.

Priority is claimed on Japanese Patent Application No. 2014-192769, filed Sep. 22, 2014, the content of which is incorporated herein by reference.

BACKGROUND ART

As a new transportation means other than buses and railways, a track transportation system which travels on a track by a traveling wheel made of a rubber tire and the like is known. Such a track transportation system is generally referred to as a new transportation system, Automated Guideway Transit (AGT), or an Automated People Mover (APM).

In this type of track transportation system, a vehicle is guided on a track by a guide wheel provided on the vehicle rolling while in contact with a guide rail provided along the track.

A vehicle of such a new transportation system is driven by automatic operation at normal times. On the other hand, during maintenance, failure, or the like, an operating device stored in a driver stand is taken out, and the operating device is connected via a wire to a vehicle to operate various types of functions of the vehicle such as traveling/stopping of the vehicle and opening and closing a door of the vehicle. Also, as an example of such an operating device, a portable driver stand is disclosed in Patent Literature 1.

CITATION LIST

Patent Literature

[Patent Literature 1]
Japanese Unexamined Patent Application, First Publication No. S60-193759

SUMMARY OF INVENTION

Technical Problem

However, because the above-described conventional operating device is assumed to be connected via a wire to a vehicle when used, the range of use of the operating device is limited. That is, when it is necessary to operate a function of the vehicle while an operator views a portion of the vehicle in an abnormal state by going under the floor of the vehicle body during maintenance, the conventional wired operating device is difficult to use. Furthermore, because at least one operating device is required to be provided for each constitution, it is currently difficult to reduce the cost.

The present invention provides a vehicle operating device capable of easily and safely operating a vehicle while reducing costs.

Solution to Problem

To solve the above problem, the present invention employs the following means.

According to a first aspect of the present invention, a vehicle operating device includes a wireless transmitting unit provided in a vehicle and configured to wirelessly transmit a state signal of the vehicle, a portable wireless receiving unit configured to acquire the state signal from the wireless transmitting unit, a portable display unit configured to display a state of the vehicle on the basis of the state signal acquired by the wireless receiving unit, a portable input unit configured to receive operation information of the vehicle input thereto on the basis of the state of the vehicle, a first information processing unit configured to process first information among the input operation information, a second information processing unit configured to process second information, which is different from the first information, among the input operation information, an interlock system configured to enable only the first information to be processed in an operating state and enable the first information and the second information to be processed in a released state, a portable wireless output unit configured to wirelessly output an operation signal of the vehicle based only on the first information processed in the operating state, and a vehicle receiving unit provided in the vehicle and configured to receive the operation signal from the wireless output unit and transmit the operation signal to a control unit that controls a function of the vehicle on the basis of the operation signal.

According to the vehicle operating device, because the display unit and the input unit are portable, an operator may carry the display unit and the input unit and check a state of the vehicle at any place without staying at a predetermined position of the vehicle. Further, the operator may control a function of the vehicle by inputting operation information. That is, a place where the operator operates a function of the vehicle is not limited. Furthermore, because the display unit and the input unit are portable, displaying a state of any vehicle selected from a plurality of vehicles (or a plurality of cars in a single composition) and inputting operation information to the selected vehicle may be performed using a single display unit and a single input unit. Consequently, the display unit and the input unit are not required to be provided for each vehicle (or car).

Also, operation information input into the portable input unit is limited to a range based on the first information and processed by the interlock system, and an operation signal is transmitted from the wireless output unit to the vehicle.

That is, a range in which the vehicle can be operated wirelessly can be limited to the range based only on the first information. Consequently, for example, when an operation range in which wireless operation does not cause a problem (e.g., operation of an air conditioner) is predefined as the first information, safety of an operator and the like can be ensured.

Also, in a vehicle operating device according to a second aspect of the present invention, the interlock system according to the first aspect may include a switching operation unit provided in the vehicle and operated to switch between the released state and the operating state.

For example, when the operator is operating the switching operation unit, wireless operation is possible within a range that is wider than that based on the first information and the second information. On the other hand, when the operator is not operating the switching operation unit or is unable to operate the switching operation unit, wireless operation is possible within a range that is narrower than that based only on the first information. Consequently, safety of an operator and the like can be ensured.

Also, in a vehicle operating device according to a third aspect of the present invention, the interlock system according to the first aspect may include a password input unit configured to switch between the released state and the operating state when a predetermined password is input.

For example, when the operator has input a predetermined password, wireless operation is possible within a range that is wider than that based on the first information and the second information. On the other hand, when the operator does not input a password or is unable to input a password, or when an input error occurs, wireless operation is possible within a range that is narrower than that based only on the first information. Consequently, safety of an operator and the like can be ensured.

Also, in a vehicle operating device according to a fourth aspect of the present invention, the display unit according to the first aspect may be a display device provided in a tablet terminal, the input unit may be a touch sensor provided in the tablet terminal, the wireless receiving unit may be a receiving device provided in the tablet terminal, and the wireless output unit may be an output device provided in the tablet terminal.

In this way, because the display unit, the input unit, and the wireless output unit are collectively provided in the portable tablet terminal, the operator can easily carry the display unit, the input unit, and the wireless output unit.

Also, a vehicle operating device according to a fifth aspect of the present invention may further include a wired input unit provided in an operation panel, which has the tablet terminal according to the fourth aspect detachably installed therein and is connected via a wire to the vehicle, and configured to receive operation information of the vehicle input thereto, and a wired output unit provided in the operation panel and configured to output an operation signal on the basis of the operation information input to the wired input unit and transmit the operation signal via a wire to the control unit. The interlock system may be in the released state when the tablet terminal is installed at the operation panel and enable an operation signal of the vehicle based on the processed first information and second information to be output from at least one of the wireless output unit and the wired output unit, and may be in the operating state when the tablet terminal is detached from the operation panel and enable an operation signal of the vehicle based only on the processed first information to be output from the wireless output unit.

In this way, when the tablet terminal capable of transmitting and receiving a signal wirelessly and the wired operation panel are used together, i.e., when the operator is near a position at which the operation panel is installed, the interlock system is in the released state and operation is possible within a range that is wider than that based on the first information and the second information. On the other hand, when the wireless tablet terminal and the wired operation panel are used separately, i.e., when the operator uses the tablet terminal away from the position at which the operation panel is installed, the interlock system is in the operating state and operation is possible within a range that is narrower than that based only on the first information. Consequently, safety of an operator and the like can be ensured.

Also, a vehicle according to a sixth aspect of the present invention includes a vehicle operating device according to any one of the first to fifth aspects and a control unit configured to operate by receiving an operation signal from the vehicle operating device.

According to the vehicle, because the vehicle operating device is provided, a place where the operator operates a function of the vehicle is not limited. Also, displaying a state of any vehicle selected from a plurality of vehicles (or a plurality of cars of a single composition) and inputting operation information of the selected vehicle may be performed using a single display unit and a single input unit. Also, a range in which the vehicle can be operated wirelessly can be limited to the range based only on the first information. Thus, safety of an operator and the like can be ensured.

Advantageous Effects of Invention

According to the vehicle operating device and the vehicle described above, the vehicle can be easily and safely operated while reducing cost.

DESCRIPTION OF EMBODIMENTS

Hereinafter, a vehicle operating device 1 according to an embodiment of the present invention will be described.

The vehicle operating device 1 is provided in a vehicle 100 having a traveling wheel 102 and a vehicle body 101 in which the traveling wheel 102 is provided, and operates various types of functions of the vehicle 100. In the embodiment, the vehicle 100 is a vehicle of Automated Guideway Transit (AGT) and is driven by automatic operation at normal times.

Figure 1:
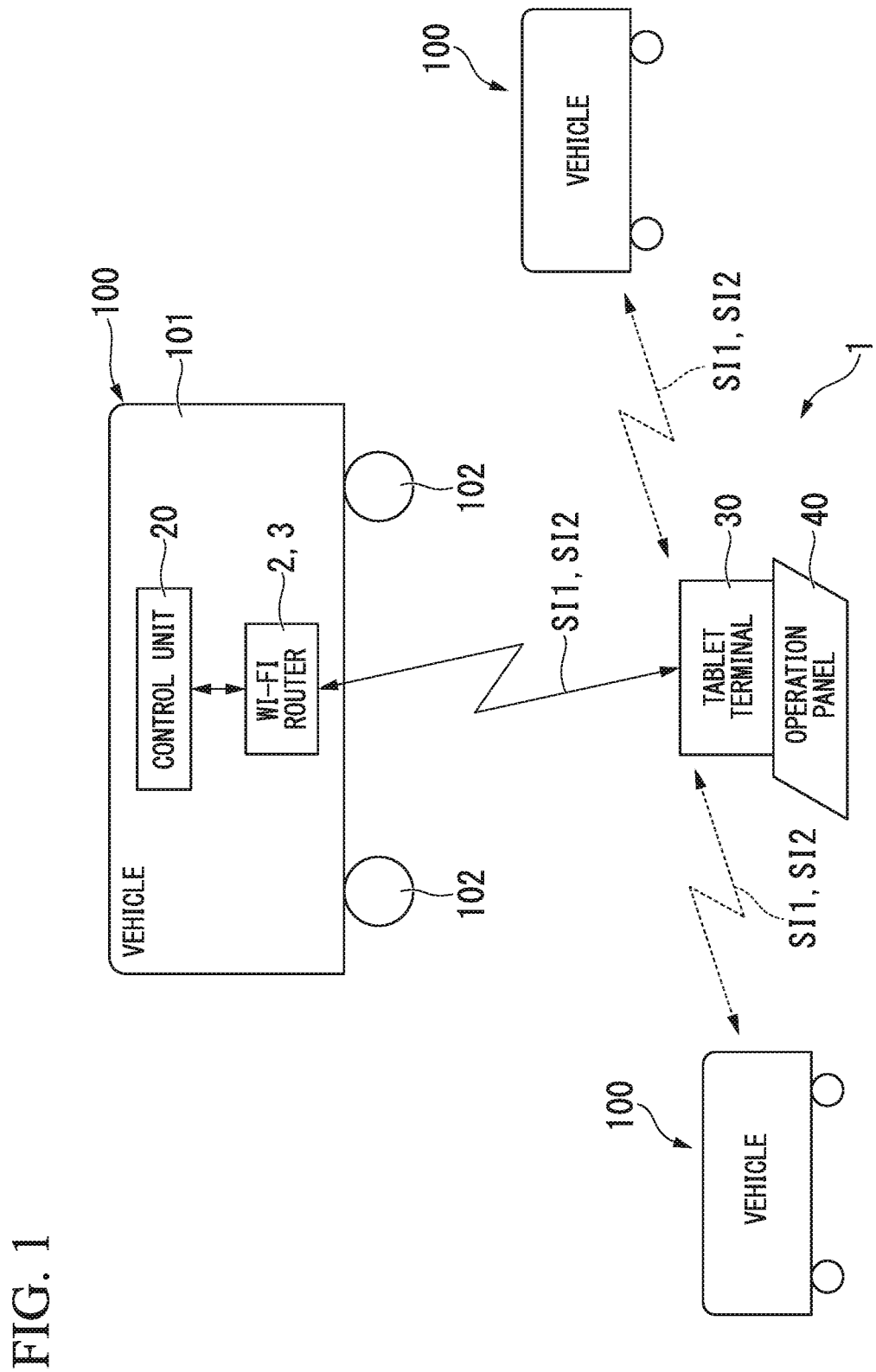
FIG. 1 is an overall schematic block diagram illustrating a vehicle operating device and a vehicle according to an embodiment of the present invention.
Figure 2:
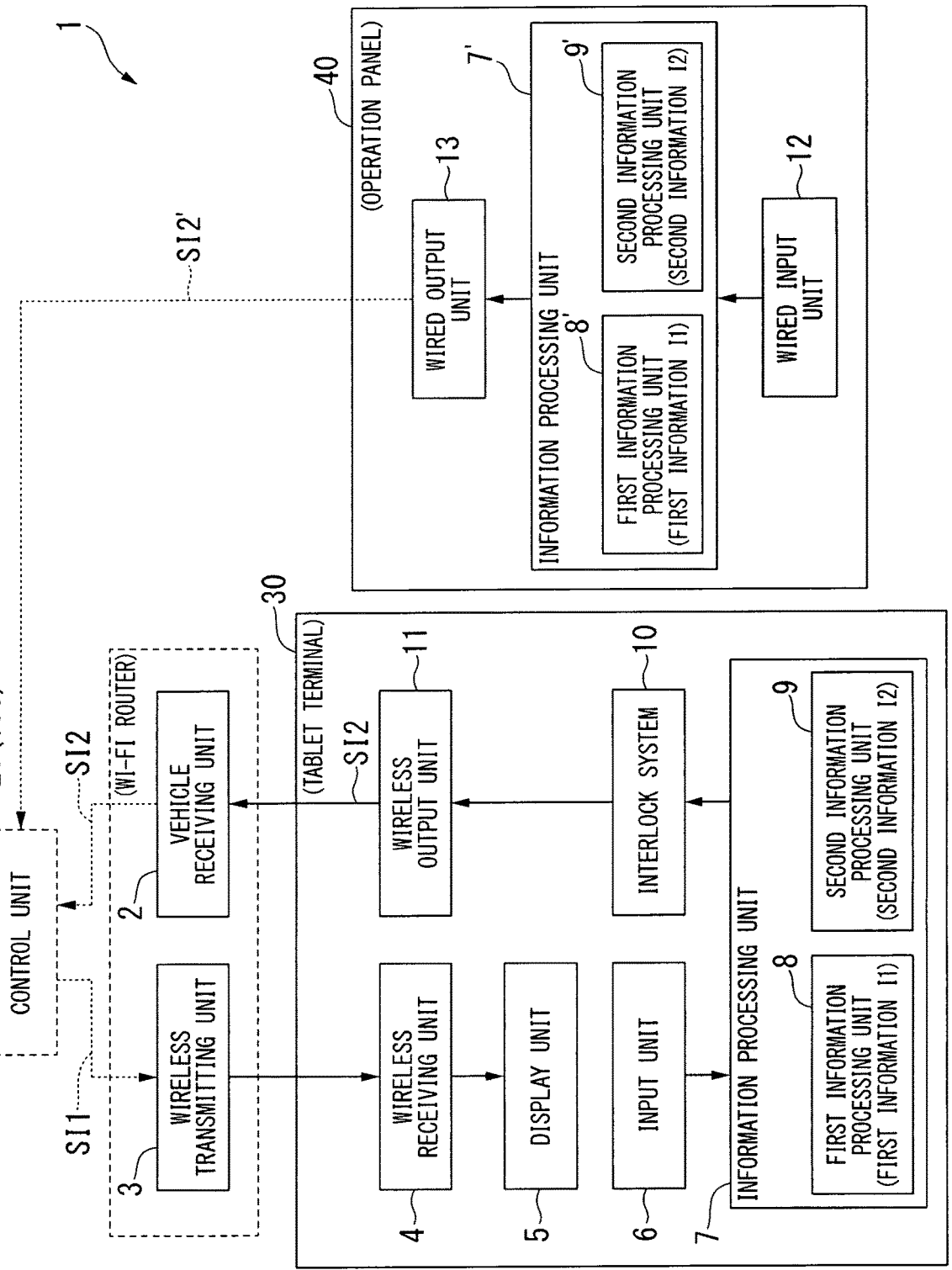
FIG. 2 is a block diagram illustrating a functional configuration that shows a vehicle operating device according to an embodiment of the present invention.

As illustrated in FIGS. 1 and 2, the vehicle operating device 1 includes a wireless transmitting unit 3 configured to wirelessly transmit a state signal SI1 of the vehicle 100, a wireless receiving unit 4 configured to acquire the state signal SI1 from the wireless transmitting unit 3, a display unit 5 configured to display a state of the vehicle 100 on the basis of the state signal SI1, an input unit 6 configured to receive operation information of the vehicle 100 input thereto, and an information processing unit 7 configured to process the input operation information.

Also, the vehicle operating device 1 includes an interlock system 10 configured to change information that is able to be processed by the information processing unit 7, a wireless output unit 11 configured to output an operation signal SI2 of the vehicle 100 on the basis of the processed information, and a vehicle receiving unit 2 configured to receive the operation signal SI2.

Also, according to the embodiment, the vehicle operating device 1 includes a wired input unit 12 provided in the vehicle 100 and configured to receive operation information of the vehicle 100 input thereto, a wired output unit 13 configured to output the operation signal SI2' of the vehicle 100 on the basis of the operation information input to the wired input unit 12, and a vehicle receiving unit 2 configured to receive the operation signal SI2 from the wireless output unit 11.

The wireless transmitting unit 3 is a wireless fidelity (Wi-Fi) router provided in the vehicle 100 and is connected via a wired local area network (LAN) to a control unit 20 configured to control a function of the vehicle 100. The wireless transmitting unit 3 acquires the state signal SI1 of the vehicle 100 from the control unit 20 and wirelessly transmits the state signal SI1.

A wireless receiving unit 4 acquires the state signal SI1 from the wireless transmitting unit 3. This wireless receiving device is a receiving device provided in a tablet terminal 30. That is, the wireless receiving unit 4 is portable.

The display unit 5 displays states of various types of functions of the vehicle 100 on the basis of the state signal SI1 acquired by the wireless receiving unit 4. As will be described below, the various types of functions are operation information of the vehicle 100 and indicate all functions provided in the vehicle, such as interior lighting, an air conditioner, and travel of the vehicle.

Also, the display unit 5 is a display device provided in the tablet terminal 30. That is, the display unit 5 is portable.

The input unit 6 may receive operation information of the vehicle 100 input thereto on the basis of a state of the vehicle 100 displayed on the display unit 5. The input unit 6 is a touch sensor provided in the tablet terminal 30. That is, the input unit 6 is portable.

Here, the following are given as examples of operation information of the vehicle 100.

[First Information I1]
 Operation mode of the vehicle 100 (manual operation/automatic operation)
 ON/OFF of the interior lighting
 Attenuated state of the interior lighting
 ON/OFF of headlights
 High beam/Low beam of the headlights
 ON/OFF of the air conditioner
 Set temperature of the air conditioner
 High/Low of air volume blown by the air conditioner
 Open or closed state of a door
 Travel mode of the vehicle 100 (high acceleration mode/high deceleration mode)
 Variable-voltage-variable frequency (VVVF) controller (normal mode/test mode)
 State of gradient starting (operation for starting on a hill)
 Time setting

[Second Information I2]
 Acceleration command of the vehicle 100 (an acceleration command of the vehicle 100 during manual operation)
 Deceleration command of the vehicle 100 (a deceleration command of the vehicle 100 during manual operation)
 Neutral command of the vehicle 100 (the vehicle 100 is in the neutral state during manual operation)
 Horn
 Dead man's button
 Reset of alarm of vehicle 100

The wired input unit 12 is provided in the operation panel 40, that is connected via a wire to the vehicle 100 and has a detachable tablet terminal 30 (see FIG. 4), and is configured to receive operation information of the vehicle 100 input thereto.

Figure 3:
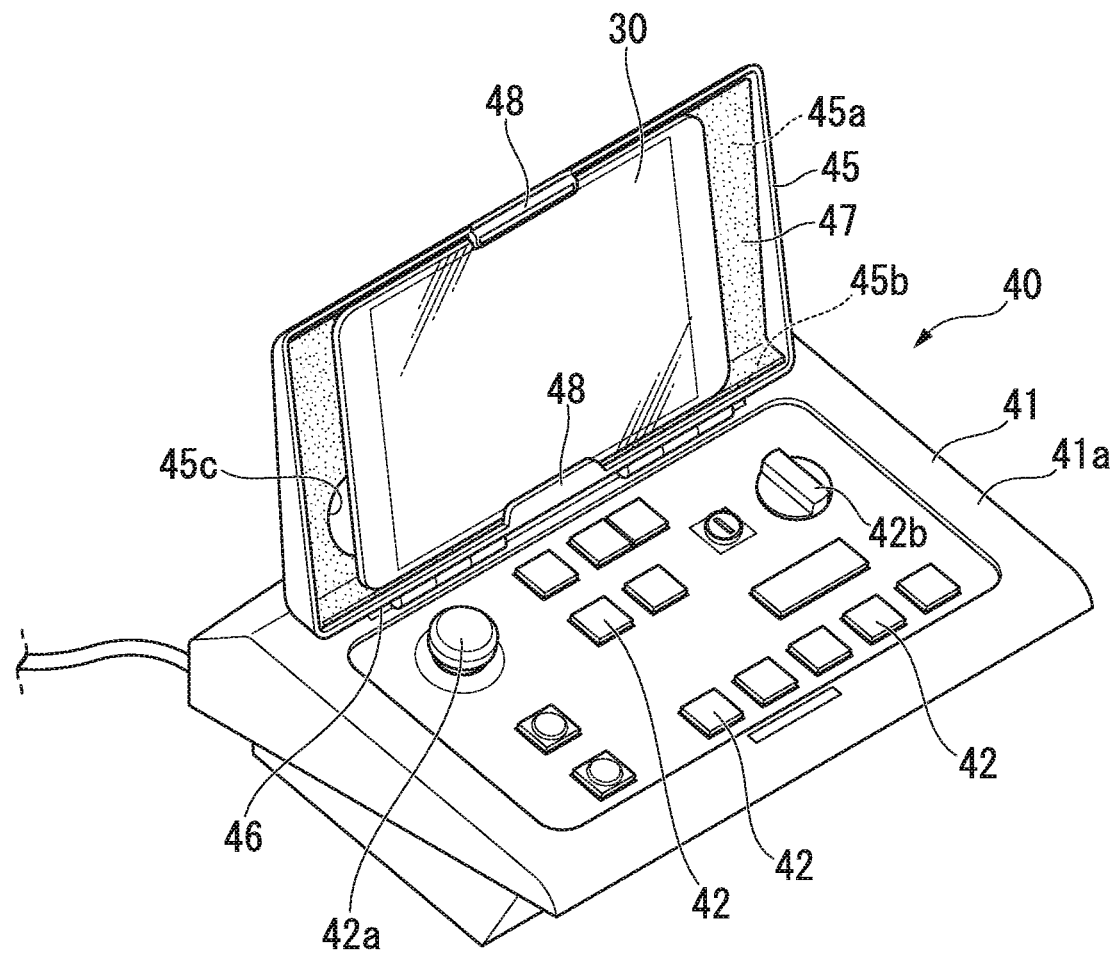
FIG. 3 is a perspective view illustrating a state in which a tablet terminal is installed at an operation panel in the vehicle operating device according to an embodiment of the present invention.
Figure 4:
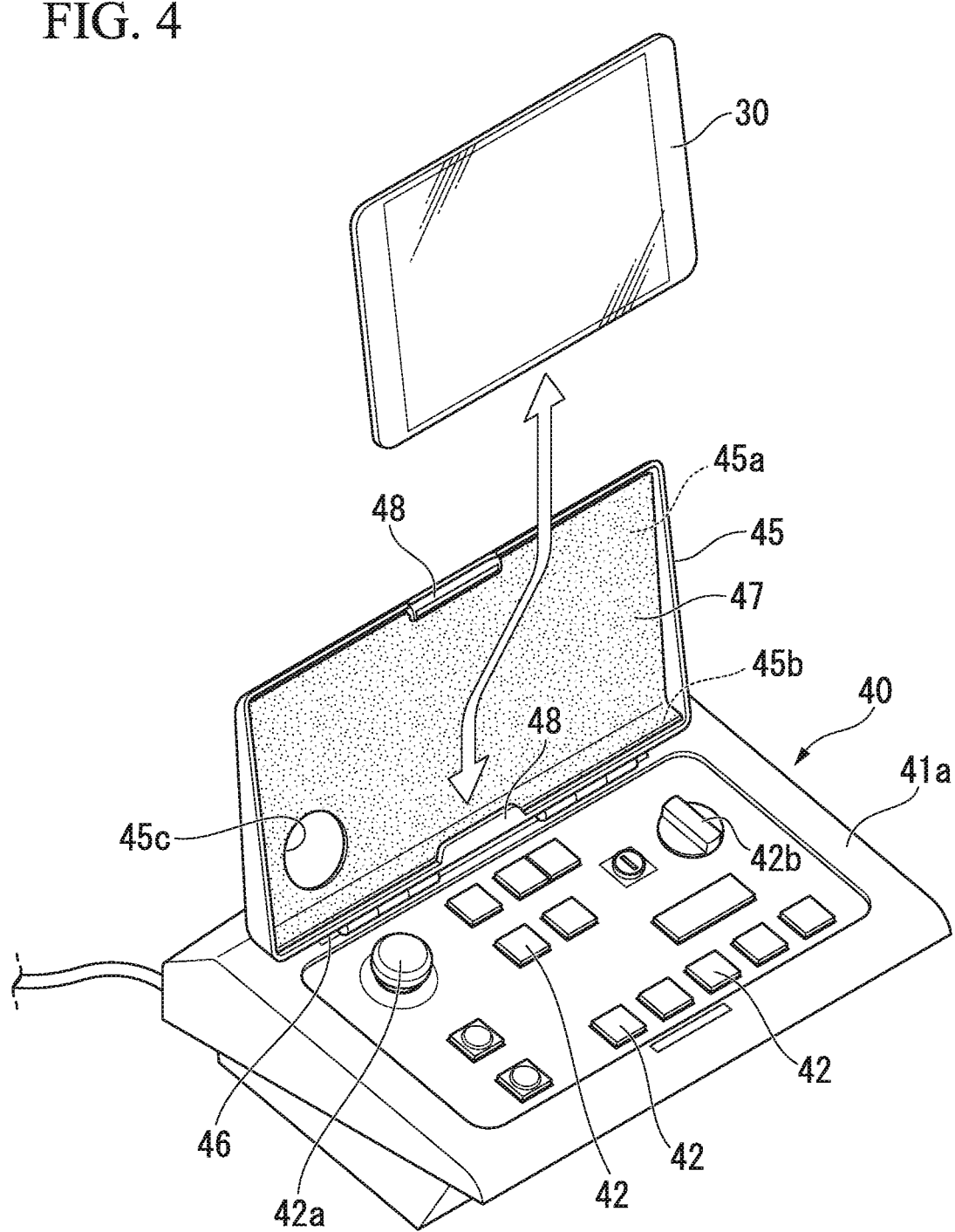
FIG. 4 is a perspective view illustrating a state in which the tablet terminal is detached from the operation panel in the vehicle operating device according to an embodiment of the present invention.

Here, as illustrated in FIGS. 3 and 4, the operation panel 40 includes a main body portion 41 having a rectangular shape, operation buttons 42 arranged on a surface 41a of the main body portion 41, a cover portion 45 provided in the main body portion 41 and configured to open and close the surface 41a of the main body portion 41 having the operation buttons 42 arranged thereon, a stopper 46 provided at a rear side of the cover portion 45 (the side at which the cover portion 45 is opened and closed) of the main body portion 41, a cushion pad 47 provided at a back surface 45a and an inner peripheral surface 45b of the cover portion 45 and configured to support the tablet terminal 30, and a claw portion 48 configured to fix the tablet terminal 30 to the cover portion 45 by protruding from the inner peripheral surface 45b of the cover portion 45 along the back surface 45a.

Figure 5:
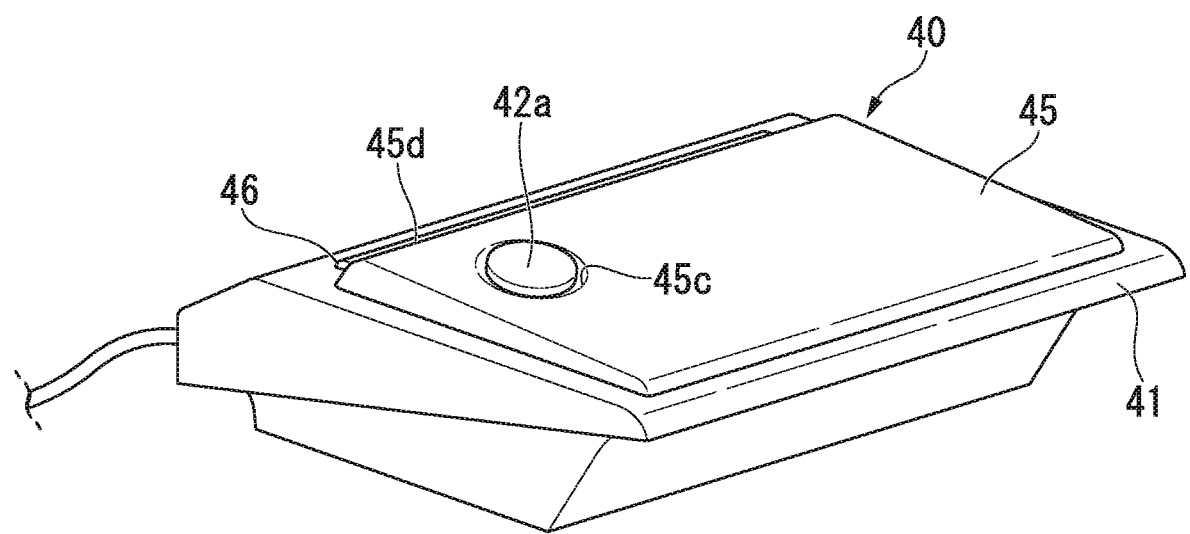
FIG. 5 is a perspective view illustrating a stored state of the operation panel in the vehicle operating device according to an embodiment of the present invention.

Also, as illustrated in FIG. 5, a through-hole 45c is formed at the cover portion 45, and an emergency switch 42a among the operation buttons 42 protrudes from the cover portion 45 through the through-hole 45c when the cover portion 45 is closed. The emergency switch 42a stops travel of the vehicle 100 in case of emergency and the like.

Also, a cushion material which is the same as that of the cushion pad 47 is provided at a surface of the stopper 46. The cushion material elastically supports an outer peripheral surface 45d at the side at which the cover portion 45 is opened and closed when the cover portion 45 is open.

The wired input unit 12 has the operation buttons 42 of the operation panel 40. The wired input unit 12 is not limited to having the operation buttons 42, but may have an operation dial 42b and an operation handle (e.g., a MasCon (a master controller)) which is not illustrated.

The information processing unit 7 includes two information processing units: a first information processing unit 8 configured to process the first information I1 among the operation information input to the input unit 6 and a second information processing unit 9 configured to process the second information I2.

In the embodiment, the first information processing unit 8 and the second information processing unit 9 are provided inside the tablet terminal 30.

The interlock system 10 enables only the first information I1 to be processed by the first information processing unit 8 in the operating state and enables the first information I1 and the second information I2 to be processed by the first information processing unit 8 and the second information processing unit 9 in the released state.

In the embodiment, the interlock system 10 is in the released state when the tablet terminal 30 is attached to the cover portion 45 of the operation panel 40. On the other hand, the interlock system 10 is in the operating state when the tablet terminal 30 is detached from the operation panel 40.

More specifically, the interlock system 10 has, for example, a sensor (not illustrated) provided at the cover portion 45, determines whether the tablet terminal 30 is attached to the cover portion 45, and changes between the released state and the operating state.

Alternatively, the interlock system 10 has, for example, a switch (not illustrated) provided at the cover portion 45, the switch is turned on when the tablet terminal 30 is attached to the cover portion 45 and the switch is pressed by the tablet terminal 30, and the switch is turned off when the tablet terminal 30 is detached and pressure on the switch is released. In this way, a change between the released state and the operating state occurs.

The wired output unit 13 is provided in the main body portion 41 of the operation panel 40. The wired output unit 13 may output the operation signal SI2' of the vehicle 100 to the vehicle 100 on the basis of both the first information I1 and the second information I2 as operation information input to the wired input unit 12 by the operator.

That is, the first information processing unit 8' and the second information processing unit 9' as processing units 7' are also provided at the operation panel 40.

The wireless output unit 11 is an output device provided in the tablet terminal 30. The wireless output unit 11 outputs the operation signal SI2 of the vehicle 100 to the vehicle 100 on the basis of operation information input to the input unit 6 by the operator. That is, the wireless output unit 11 is portable.

Also, when the interlock system 10 is in the operating state, the wireless output unit 11 wirelessly outputs the operation signal SI2 of the vehicle 100 based only on the first information I1. On the other hand, when the interlock system 10 is in the released state, the wireless output unit 11 wirelessly outputs the operation signal SI2 of the vehicle based on the processed first information I1 and second information I2.

In other words, the wireless output unit 11 may output the operation signal SI2 based on the second information I2 only in the operating state. On the other hand, the wired output unit 13 may always output the operation signal SI2 based on the ranges of both the first information I1 and the second information I2.

The vehicle receiving unit 2 is a Wi-Fi router provided in the vehicle 100 and configured to receive the operation signal SI2 from the wireless output unit 11. Further, the vehicle receiving unit 2 is connected via a wired LAN to the control unit 20 provided in the vehicle 100. The vehicle receiving unit 2 transmits the received operation signal SI2 to the control unit 20.

In the embodiment, the vehicle receiving unit 2 is integrated with the wireless transmitting unit 3 to form a Wi-Fi router.

Figure 6:
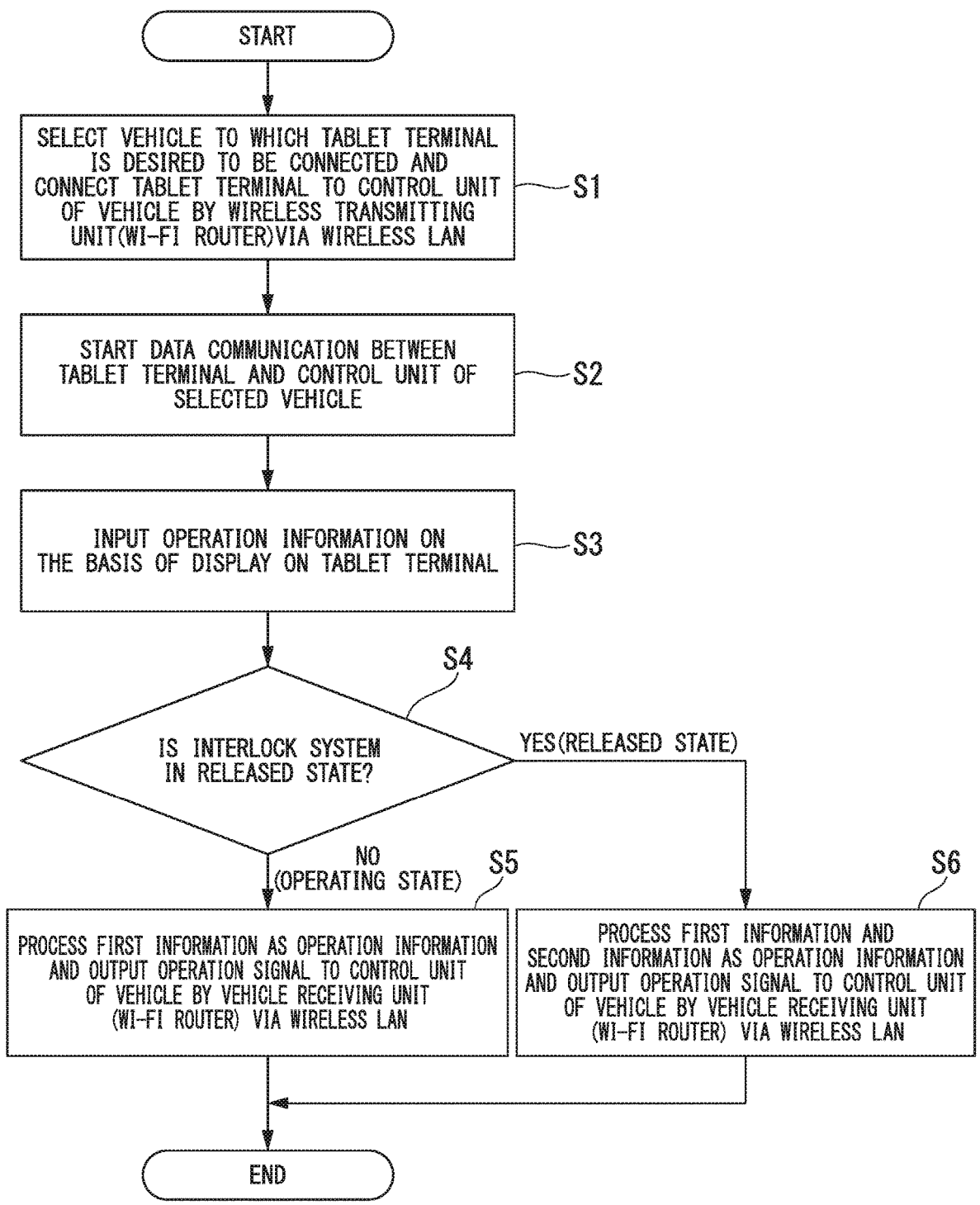
FIG. 6 is a view illustrating a processing flow in the vehicle operating device according to the embodiment of the present invention.

Next, a data processing flow in the vehicle operating device 1 will be described with reference to FIG. 6.

First, the operator operates the touch sensor of the tablet terminal 30, i.e., operates the input unit 6, and selects the vehicle 100 to which he or she desires to connect the tablet terminal 30. Then, the tablet terminal 30 is connected to the vehicle receiving unit 2 of the selected vehicle 100 via the wireless LAN (Step 1).

Then, data communication is performed wirelessly between the tablet terminal 30 and the vehicle 100 (Step S2).

Further, the operator operates the touch sensor of the tablet terminal 30, i.e., operates the input unit 6, while checking a state of the vehicle 100 by checking content displayed on the display device of the tablet terminal 30, and inputs operation information of the vehicle 100 (Step 3).

Next, whether the interlock system 10 is in the operating state (a state in which the tablet terminal 30 is detached from the operation panel 40) or in the released state (a state in which the tablet terminal 30 is attached to the operation panel 40) is determined (Step S4). Then, it is determined as YES when the interlock system 10 is in the released state, and it is determined as NO when the interlock system 10 is in the operating state.

Specifically, when it is determined as NO, the first information processing unit 8 processes operation information only when the operation information input to the input unit 6 is information included in the first information I1. Then, the operation signal SI2 based on the first information I1 is output to the control unit 20 of the vehicle 100, and the control unit 20 is operated on the basis of the operation signal SI2 (Step S5).

On the other hand, when it is determined as YES, the first information processing unit 8 and the second information processing unit 9 process operation information even when the operation information input to the input unit 6 belongs to one of the first information I1 and the second information I2. Then, the operation signal SI2 based on the first information I1 and the second information I2 is output to the control unit 20 of the vehicle 100, and the control unit 20 is operated based on the operation signal SI2 (Step S6).

According to the vehicle operating device 1, the display unit 5 and the input unit 6 are provided in the tablet terminal 30 and are portable. Thus, the operator may carry the tablet terminal 30 and check a state of the vehicle 100 and input operation information of the vehicle 100 at any place without staying at a predetermined position of the vehicle 100. That is, a place where the operator operates a function of the vehicle 100 is not limited.

Further, for example, as shown by broken lines in FIG. 1, the vehicle 100 to which the tablet terminal 30 is desired to be wirelessly connected is selected among a plurality of vehicles 100 regardless of the position of the operator, the tablet terminal 30 is connected to the selected vehicle 100, the state signal SI1 of the selected vehicle 100 is received, and the operation signal SI2 is output to operate the vehicle 100.

Furthermore, because the display unit 5, the input unit 6, and the wireless output unit 11 are provided in the portable tablet terminal 30, inputting operation information to a plurality of vehicles (or a plurality of cars in a single composition) may be performed using a single display unit 5 and a single input unit 6. Consequently, the display unit 5 and the input unit 6 are not required to be provided for each vehicle 100 (or car), and there is a merit in terms of cost.

Also, when the tablet terminal 30 is separated from the operation panel 40, the interlock system 10 operates. Then, with operation information of the vehicle 100 limited to a range based on the first information I1, the operation signal SI2 is wirelessly transmitted to the vehicle 100 by the wireless output unit 11. That is, when the operator uses the tablet terminal 30 away from a position at which the operation panel 40 is installed and the interlock system 10 is in the operating state, a range in which the tablet terminal 30 can perform wireless operation is limited to a range based only on the first information I1, and wireless operation is possible only within a narrower range.

On the other hand, when the tablet terminal 30 and the operation panel 40 are used together, i.e., when the operator is near the position at which the operation panel 40 is installed and the interlock system 10 is in the released state, wireless operation is possible over a range that is wider than that based on the first information I1 and the second information I2. Further, wired operation by the operation panel 40 is also possible together with the wireless operation.

Consequently, for example, when an operation range in which wireless operation does not cause a problem (e.g., operation of an air conditioner) is predefined as the first information I1 described above and an operation range in which wired operation is required to be performed (e.g., travel control of a vehicle) is predefined as the second information I2 described above, safety of an operator and the like can be ensured.

In the embodiment, by using the vehicle operating device 1, the vehicle 100 can be easily and safely operated while reducing cost.

Although embodiments of the present invention have been described in detail above, some design changes may be made within a scope not departing from the technical spirit of the present invention.

Figure 7:
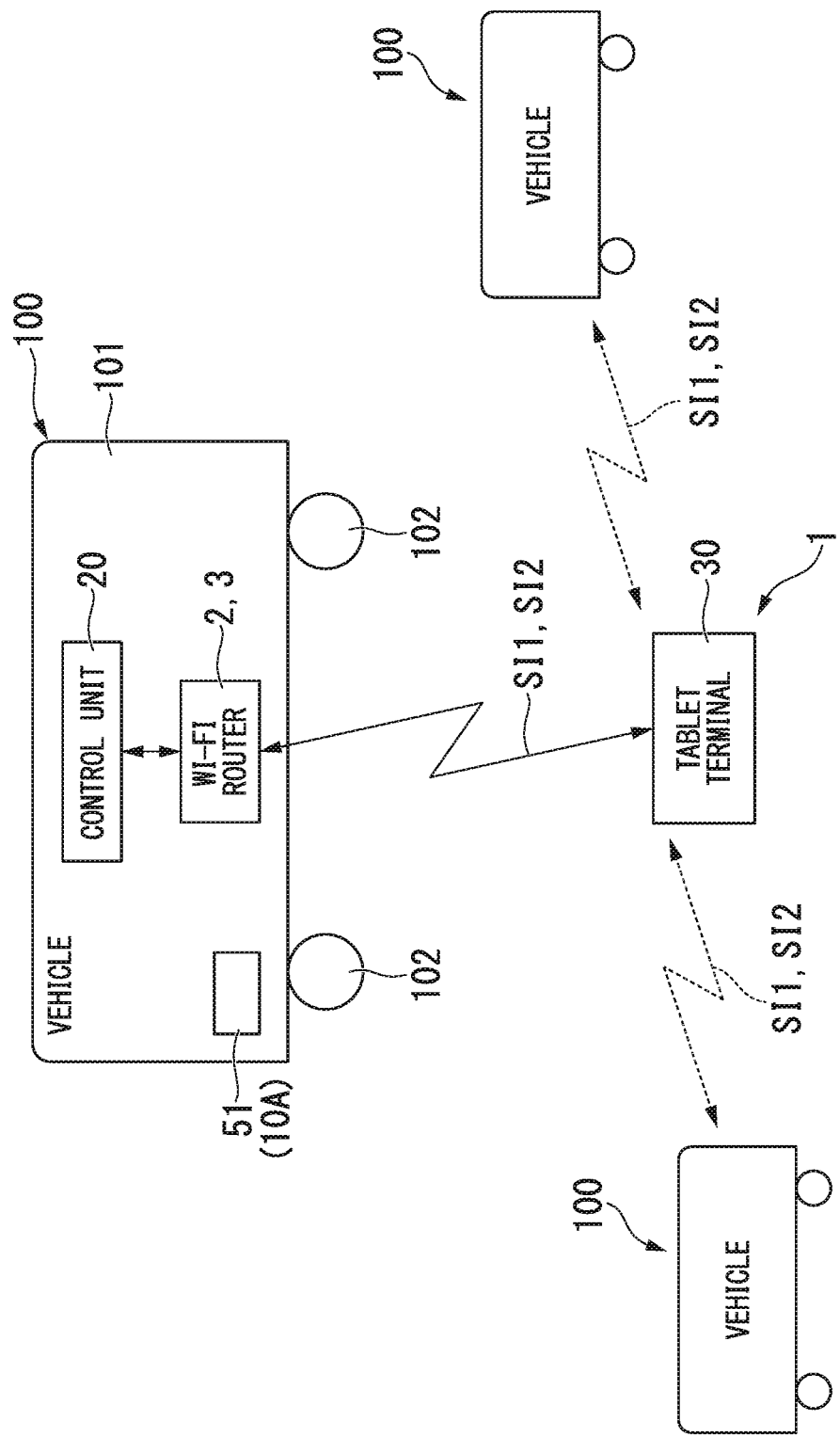
FIG. 7 is an overall schematic block diagram illustrating a vehicle operating device and a vehicle according to a first modification of an embodiment of the present invention.

For example, unlike the case of the above-described embodiment, as illustrated in FIG. 7, an interlock system 10A may have a switching operation unit 51 provided in the vehicle 100 and configured to be manually operated by an operator. The interlock system 10A is switched between the released state and the operating state when the switching operation unit 51 is operated. The switching operation unit 51 is an operation button or the like provided on a wall surface or the like of the vehicle 100.

Figure 8:
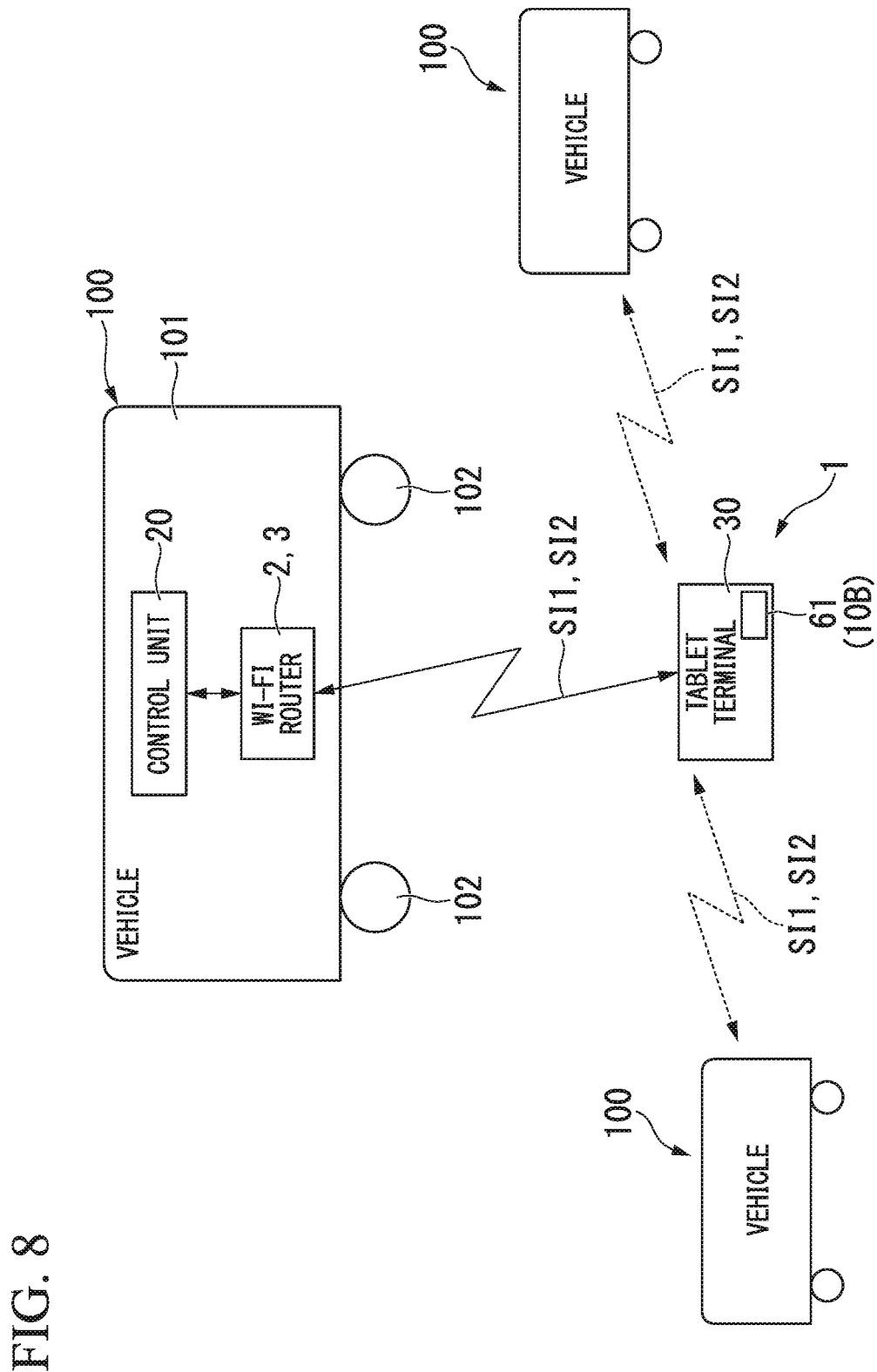
FIG. 8 is an overall schematic block diagram illustrating a vehicle operating device and a vehicle according to a second modification of an embodiment of the present invention.

Also, as illustrated in FIG. 8, an interlock system 10B may have a password input unit 61 provided in the tablet terminal 30. The interlock system 10B is switched between the released state and the operating state when a predetermined password is input to the password input unit 61 through the touch sensor. Instead of being provided in the tablet terminal 30, the password input unit 61 may be a monitor (a touch panel), an operation button, or the like provided on a wall surface or the like of the vehicle 100.

When the interlock systems 10A and 10B illustrated in FIGS. 7 and 8 are employed, the wired operation panel 40 is unnecessary, and operations of functions of the vehicle 100 (all operations of the first information I1 and the second information I2) are wirelessly possible using only the tablet terminal 30.

Also, wireless operations of a plurality of vehicles 100 (or a plurality of cars in a single composition) may be simultaneously performed by a single tablet terminal 30. That is, state signals of the plurality of vehicles 100 may be acquired and displayed, and an operation signal may be output to each of the plurality of vehicles 100 using a single display unit 5, a single input unit 6, and a single wireless output unit 11. Specifically, air conditioners of all commercial vehicles 100 may be simultaneously turned on upon starting of the vehicles 100.

Also, a vehicle 100 operated by the operation panel 40 may be different from a vehicle 100 operated by the tablet terminal 30.

Also, the first information processing unit 8 may be provided only in the tablet terminal 30, and the second information processing unit 9 may be provided only in the operation panel 40. In this case, a wireless facility and a wired facility for transmitting input information from the input unit 6 provided in the tablet terminal 30 to the operation panel 40 should be separately provided.

Also, the first information processing unit 8 may be provided only in the tablet terminal 30, and the second information processing unit 9 may be provided in both the tablet terminal 30 and the operation panel 40.

Further, the display unit 5, the input unit 6, the wireless receiving unit 4, and the wireless output unit 11 may be provided in a mobile phone terminal instead of the tablet terminal 30. Also, the display unit 5, the input unit 6, the wireless receiving unit 4, and the wireless output unit 11 may be provided in separate terminals.

Further, the first information I1 and the second information I2 described above are examples of operation information of the vehicle 100, and classification between the first information I1 and the second information I2 is not limited to the above-described case. For example, some of the second information I2 described above may be included in the first information I1.

INDUSTRIAL APPLICABILITY

According to the vehicle operating device and the vehicle described above, a vehicle may be easily and safely operated while reducing cost.

REFERENCE SIGNS LIST

1 Vehicle operating device
2 Vehicle receiving unit
3 Wireless transmitting unit
4 Wireless receiving unit
5 Display unit
6 Input unit
7 Information processing unit
8 First information processing unit
9 Second information processing unit
10, 10A, 10B Interlock system
11 Wireless output unit
12 Wired input unit
13 Wired output unit
20 Control unit
30 Tablet terminal
40 Operation panel
41 Main body portion
41a Surface
42 Operation button
42a Emergency button
42b Operation dial
45 Cover portion
45a Back surface
45b Inner peripheral surface
45c Through-hole
45d Outer peripheral surface
46 Stopper
47 Cushion pad
48 Claw portion
51 Switching operation unit
61 Password input unit
100 Vehicle
101 Vehicle body
102 Traveling wheel
I1 First information
I2 Second information
SI1 State signal
SI2 Operation signal

The invention claimed is:

1. A vehicle operating device comprising:
a wireless transmitting unit provided in the vehicle and configured to wirelessly transmit a state signal of the vehicle;
a portable tablet terminal which includes:
a wireless receiving unit configured to acquire the state signal from the wireless transmitting unit,
a display unit configured to display a state of the vehicle on a basis of the state signal acquired by the wireless receiving unit,
a touch sensor configured to receive operation information of the vehicle input thereto on the basis of the state of the vehicle,
a wireless output unit configured to wirelessly output an operation signal of the vehicle;
an information processing unit which includes:
a first information process unit configured to process first information, wherein the first information includes control of interior lighting, control of headlights, control of an air condition, and control of a door, and
a second information process unit configured to process second information, wherein the second information includes an acceleration command of the vehicle, a deceleration command of the vehicle, a neutral command of the vehicle, a horn, a dead man's button, and a reset of alarm of the vehicle;
an interlock system which is in a released state when the portable tablet terminal is installed at an operation panel and in an operating state when the portable tablet terminal is detached from the operation panel, wherein:
the released state enables the first information and the second information to be output from at least one of the wireless output unit and a wired output unit, and
the operating state enables only the first information to be output from the wireless output unit;
a vehicle receiving unit provided in the vehicle and configured to receive the operation signal from the wireless output unit and transmit the operation signal to a control unit that controls a function of the vehicle on the basis of the operation signal;
a wired input unit provided in the operation panel, which has the portable tablet terminal detachably installed therein and is connected via a wire to the control unit, and configured to receive the operation information of the vehicle input thereto; and
the wired output unit provided in the operation panel and configured to output the operation signal on the basis of the operation information input to the wired input unit and transmit the operation signal via the wire to the control unit;
wherein the wireless transmitting unit, the vehicle receiving unit, the wired input unit, and the wired output unit are provided in the vehicle.

2. The vehicle operating device according to claim 1, wherein the interlock system includes a switching operation unit provided in the vehicle and operated to switch between the released state and the operating state.

3. The vehicle operating device according to claim 1, wherein the interlock system includes a password input unit configured to switch between the released state and the operating state when a predetermined password is input.

4. The vehicle operating device according to claim 1, wherein:
the display unit is a display device provided in the tablet terminal;
the wireless receiving unit is a receiving device provided in the tablet terminal; and
the wireless output unit is an output device provided in the tablet terminal.

5. A vehicle comprising:
a vehicle operating device according to claim 1; and
the control unit configured to operate by receiving an operation signal from the vehicle operating device.

6. A vehicle operating device comprising:
a vehicle that travels on a track, and includes a control unit controlling the vehicle, and an operation panel connected via a wire to the control unit and configured to receive operation information of the vehicle input thereto;
a wireless transmitting unit provided in the vehicle and configured to wirelessly transmit a state signal of the vehicle;
a portable tablet terminal which includes:
a wireless receiving unit configured to acquire the state signal from the wireless transmitting unit,
a display unit configured to display a state of the vehicle on a basis of the state signal acquired by the wireless receiving unit,
a touch sensor configured to receive operation information of the vehicle input thereto on the basis of the state of the vehicle,
a wireless output unit configured to wirelessly output an operation signal of the vehicle;
an information processing unit which includes:
a first information process unit configured to process first information, wherein the first information includes control of interior lighting, control of headlights, control of an air condition, and control of a door, and
a second information process unit configured to process second information, wherein the second information includes an acceleration command of the vehicle, a deceleration command of the vehicle, a neutral command of the vehicle, a horn, a dead man's button, and a reset of alarm of the vehicle;
an interlock system which is in a released state when the portable tablet terminal is installed at an operation panel and in an operating state when the portable tablet terminal is detached from the operation panel, wherein:
the released state enables the first information and the second information to be output from at least one of the wireless output unit and a wired output unit, and
the operating state enables only the first information to be output from the wireless output unit;
a vehicle receiving unit provided in the vehicle and configured to receive the operation signal from the wireless output unit and transmit the operation signal to the control unit that controls a function of the vehicle on the basis of the operation signal;
a wired input unit provided in the operation panel, which has the portable tablet terminal detachably installed therein and is connected via the wire to the control unit, and configured to receive the operation information of the vehicle input thereto; and
the wired output unit provided in the operation panel and configured to output the operation signal on the basis of the operation information input to the wired input unit and transmit the operation signal via the wire to the control unit;

wherein the wireless transmitting unit, the vehicle receiving unit, the wired input unit, and the wired output unit are provided in the vehicle.

* * * * *